United States Patent [19]
Seidel
[11] 3,906,401
[45] Sept. 16, 1975

[54] FEEDFORWARD ERROR CORRECTION IN INTERFEROMETER MODULATORS

[75] Inventor: Harold Seidel, Warren, N.J.

[73] Assignee: Bell Telephone Laboratories, Incorporated, Murray Hill, N.J.

[22] Filed: Sept. 3, 1974

[21] Appl. No.: 502,453

[52] U.S. Cl. .................. 332/18; 325/184; 330/149; 332/37 R

[51] Int. Cl.$^{2}$.... H03C 1/06; H03C 3/08; H03F 1/26

[58] Field of Search ............ 332/37 R, 37 D, 41, 18; 325/148, 184, 474–476; 330/10, 149

[56] References Cited

UNITED STATES PATENTS

| | | | |
|---|---|---|---|
| 3,348,126 | 10/1967 | Kaufman | 330/149 X |
| 3,471,798 | 10/1969 | Seidel | 330/149 |
| 3,541,467 | 11/1970 | Seidel | 330/149 X |
| 3,777,275 | 12/1973 | Cox | 330/10 |
| 3,815,040 | 6/1974 | Seidel | 332/37 R X |

*Primary Examiner*—Alfred L. Brody
*Attorney, Agent, or Firm*—S. Sherman

[57] ABSTRACT

Modulation distortion due to phase modulation error in an interferometer type modulator is minimized by extracting a portion of the phase modulated carrier frequency signals in the two branches of the interferometer and sensing the resulting amplitude modulation in an auxiliary interferometer circuit. The modulation signal is compared with the input modulation signal and a weighted error signal is formed. The latter is then used to impress an error correcting phase modulation on the carrier frequency signals.

2 Claims, 4 Drawing Figures

FEEDFORWARD ERROR CORRECTION IN INTERFEROMETER MODULATORS

This invention relates to interferometer modulators.

BACKGROUND OF THE INVENTION

In many communications systems linear processing of amplitude modulated signals is required because the information being transmitted is either totally or partially conveyed in the amplitude variations of the high frequency carrier signal. This includes systems utilizing standard AM transmission, and systems having more complex amplitude varying signals such as are produced by single sideband modulation, or by frequency multiplexing of sets of separately modulated carriers. In each of the latter systems, the signal contains a composite of both amplitude and phase fluctuations.

A problem one typically encounters is that high frequency, linear power amplifiers are difficult to produce. As such, they are either just unavailable or, if available, are too expensive. By contrast, high power, nonlinear amplifiers are readily available at both high microwave and millimeter wave frequencies, and at much lower cost.

In U.S. Pat. No. 3,777,275 there is disclosed one means of utilizing nonlinear devices to produce linear amplification. In particular, this amplifier employs an interferometer type circuit wherein two phase modulated signals are combined in a hybrid coupler to produce an amplitude modulated output signal. However, if the resulting amplitude modulation is to be linear function of the modulating signal $e(t)$, the phase modulator input-output characteristic must be such that the modulating signal $e(t)$ is proportional to the sine of the resulting phase modulation $\phi(t)$. To the extent that this relation is not maintained, the output signal will include an amplitude error component dA.

The broad object of the present invention is, therefore, to reduce the amplitude error in interferometer type circuits such as linear amplitude modulators and linear amplifiers.

SUMMARY OF THE INVENTION

In an interferometer type amplitude modulator, the carrier frequency signal is divided into two equal components. The two components are phase modulated, preferrably antisymmetrically, by the information signal, amplified as required, and then combined in a 3dB output hybrid coupler. The resulting output signal derived from the output coupler is an amplitude modulated signal whose amplitude is proportional to sin $\phi(t)$. If, however, the amplitude modulation is not proportional to the modulating signal $e(t)$, an amplitude error signal dA results.

In accordance with the present invention, an amplitude error signal dA produced in an interferometer type amplitude modulator is sensed in an auxiliary interferometer circuit by extracting portions of the two phase modulated carrier signals from the two wavepaths of the main interferometer circuit. A weighted phase error signal $e_r$ is then generated and used to impress an error correcting phase modulation $d\phi(t)$ upon the two carrier signal components before recombination in the output coupler.

In applications requiring a high degree of linearity, the error correction process can be repeated as often as necessary.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
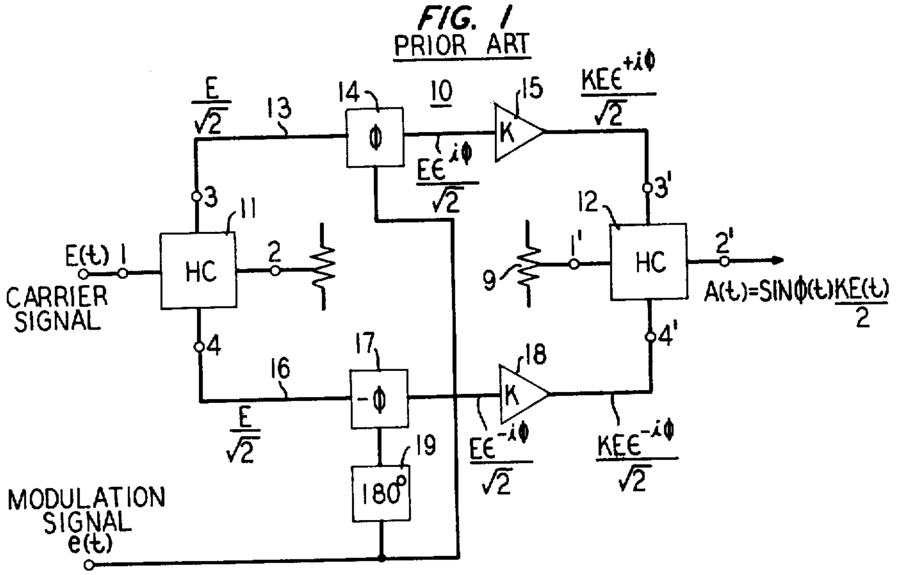
FIG. 1 PRIOR ART
FIG. 1 shows a prior art interferometer type amplitude modulator.

Referring to the drawings, FIG. 1 shows, in block diagram, an interferometer type amplitude modulator 10, in accordance with the prior art, comprising: an input 3dB hybrid coupler 11; an output 3dB hybrid coupler 12; a first interconnecting wavepath 31 including therein a signal phase modulator 14 and an amplifier 15; and a second interconnecting wavepath 16 including therein a signal phase modulator 17 and an amplifier 18.

Each of the couplers 11 and 12 has four branches 1, 2, 3 and 4, and 1', 2', 3' and 4' arranged in pairs 1–2 and 3–4, and 1'–2° and 3'–4', where the branches of each pair are conjugate to each other and in coupling relationship with the branches of the other of said pairs. In addition, one pair of branches are a symmetric pair such that signal coupled from either of these branches into the other pair of branches have the same phase relationship. The other pair of branches are the antisymmetric branches in that signals coupled into the first pair of branches are either in phase or are 180 degrees out of phase, depending upon which of the other branches is energized. Examples of such devices are magic-T couplers and hybrid transformers.

The two couplers are connected in tandem such that the branches of one pair of conjugate branches of one are coupled, respectively, to a different branch of one pair of conjugate branches of the other. More specifically, one of the interconnecting wavepaths 13 connects branch 3 of input coupler 11 to branch 3' of output coupler 12. The other interconnecting wavepath 16 connects branch 4 of coupler 11 to branch 4' of coupler 12. Branch 1' of output coupler 12 is terminated by a resistor 9. Branch 2' is the output port of the modulator.

In operation, a constant amplitude input carrier frequency signal $E(t)$, applied to branch 1 of input coupler 11, is divided into two equal components of amplitude $E/\sqrt{2}$ in branches 3 and 4.

Simultaneously, a modulating signal $e(t)$ is applied to phase modulator 14, and to phase modulator 17 through a 180° phase shifter. The effect is to impress a phase modulation $\epsilon^{+i\phi(t)}$ onto the signal in wavepath 13 and a phase modulation $\epsilon^{-i\phi}$ (t) onto the signal in wavepath 16.

Both signals are amplified equally by means of amplifiers 15 and 18, and then coupled, respectively, to branches 3' and 4' of output coupler 12. One signal, $$\frac{KE}{2}\epsilon^{i\phi(t)},$$

coupled into branch 3', is divided into two equal, in-phase components $$\frac{KE}{2}\epsilon^{i\phi(t)}$$

in branches 1' and 2'. The other signal, $$\frac{KE}{2}\epsilon^{-i\phi(t)},$$

on the other hand, is divided into two equal, but out-of-phase components $$\frac{KE}{2}\epsilon^{-\phi(t)}$$

and $$-\frac{KE}{2}\epsilon^{-i\phi(t)}$$

in branches 1' and 2'. The several signal components then combine in coupler branches 1' and 2' to produce a difference signal $$A_{2'}(t) = \frac{KE(t)}{2}\left(\epsilon^{i\phi(t)} - \epsilon^{-i\phi(t)}\right), \quad (1)$$

in coupler branch 2', and a sum signal $$A_{1'}(t) = \frac{KE(t)}{2}\left(\epsilon^{i\phi(t)} + \epsilon^{-i\phi(t)}\right), \quad (2)$$

in coupler branch 1'.

Equations (1) and (2) can be rewritten as $$A_{2'}(t) = \frac{K}{2}\sin\phi(t)\,E(t), \quad (3)$$

and $$A_{1'}(t) = \frac{K}{2}\cos\phi(t)\,E(t). \quad (4)$$

The latter signal $A_1$, is dissipated in terminating resistor 9. The difference signal $A_2$, which is an amplitude modulated, suppressed carrier signal, constitutes the useful output signal. Thus, in an interferometer modulator, a phase modulation is converted to an amplitude modulation. As explained in U.S. Pat. No. 3,777,275, the advantage of such a device resides in its ability to effect linear amplification of amplitude modulated signals by means of nonlinear amplifying devices. However, in order for the resulting amplitude modulation to be a linear function the modulating signal $e(t)$, it is necessary that $$e(t) \sim \sin\phi(t). \quad (5)$$

If, however, the phase modulator is such that the relationship between $e(t)$ and $\sin\phi(t)$ is not a linear function, the resulting phase modulation will include a phase error component $d\phi(t)$ which, in turn, will produce an amplitude error component dA in the output signal. Since, from equation (3), the signal amplitude A is $$A \sim \sin\phi(t), \quad (6)$$

the amplitude error component dA is given by $$dA \sim \cos\phi(t)\cdot d\phi(t), \quad (7)$$

or $$d\phi(t) \sim \frac{dA}{\cos\phi(t)}. \quad (8)$$

Equation (8) states that any amplitude error $dA$ in the difference output signal can be corrected by a weighted phase change $d\phi(t)$, where the weighting factor is $1/\cos\phi(t)$.

Figure 2:
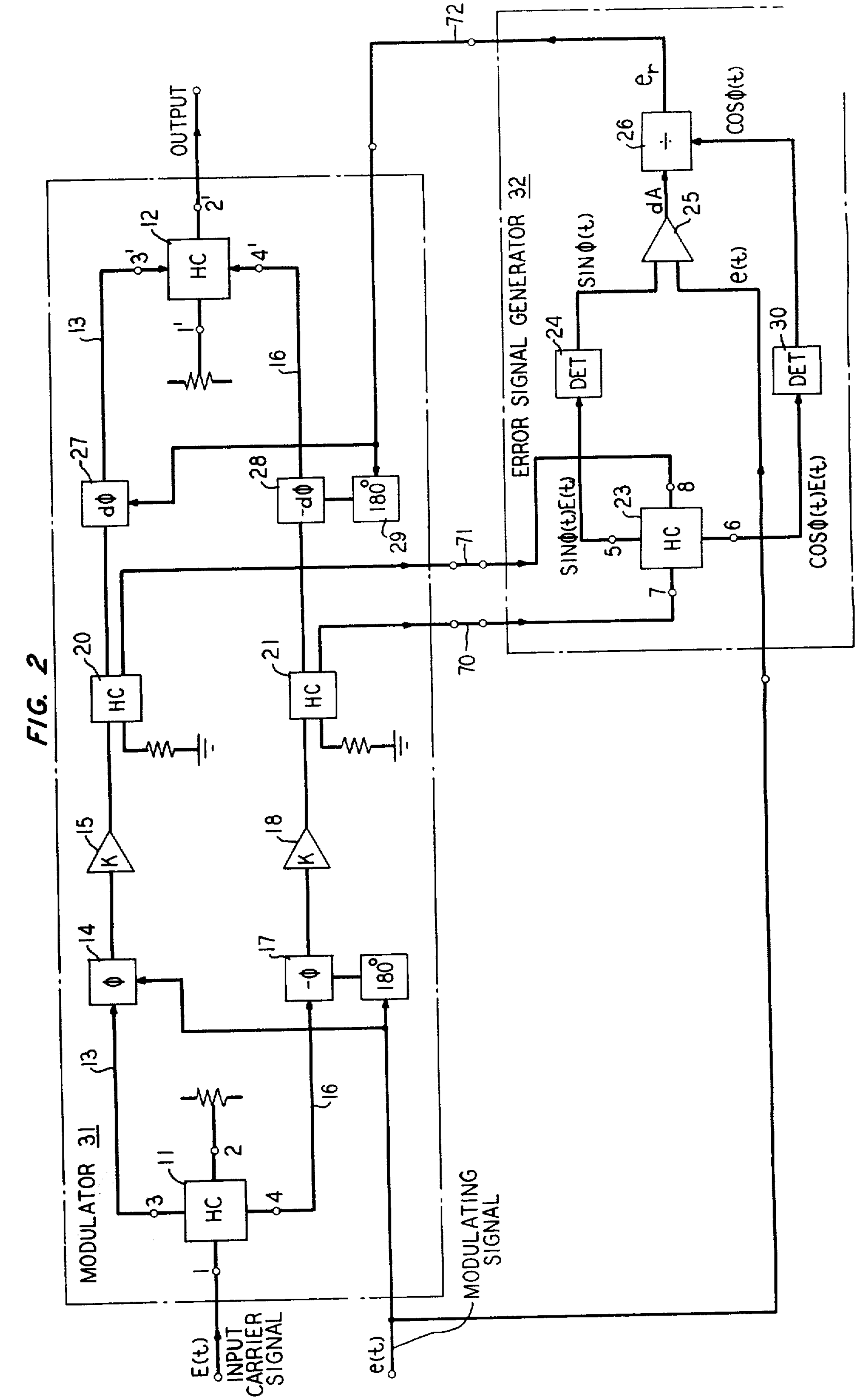
FIG. 2 shows an error correction circuit, in accordance with one invention, for use with the interferometer modulator of FIG. 1.

FIG. 2, now to be considered, shows an interferometer type modulator, modified in accordance with the present invention to effect the above-described error correction. Using the same identification numerals as in FIG. 1 to identify corresponding components, the modulator 31 in FIG. 2 comprises an input 3dB hybrid coupler 11, an output 3dB hybrid coupler 12, and a pair of interconnecting wavepaths 13 and 16. The latter, however, are modified so that in addition to a signal phase modulator and an amplifier, each wavepath includes a signal sampling coupler and an error correcting phase modulator. Thus, wavepath 13 includes, in cascade: a signal phase modulator 14; an amplifier 15; a signal sampling coupler 20; and an error correcting phase modulator 27. Similarly, wavepath 16 includes, in cascade: a signal phase modulator 17; an amplifier 18; a signal sampling coupler 21; and an error correcting phase modulator 28. A 180° phase shifter 29 is also associated with one of the error correcting phase modulators 28.

Also included in FIG. 2 is the error signal generator 32 which generates the error correcting signal. The generator comprises: a 3dB hybrid coupler 23; a pair of amplitude detectors 24 and 30; a difference amplifier 25; and a divider circuit 26. One branch 5 of hybrid coupler 23 is coupled to one of the input ports of amplifier 25 through amplitude detector 24. Coupler branch 6, conjugate to branch 5, is coupled to one of the input ports of divider 26 through amplitude detector 30. The output port of amplifier 25 is coupled to a second divider input port.

A pair of connectors 70 and 71 couple conjugate branches 7 and 8 of coupler 23 to sampling couplers 21 and 20, respectively. A third connector 72, couples the output port of divider 26 to each of the error correcting phase modulators 27 and 28.

In operation, the sampling couplers 20 and 21 extract, respectively, a small portion of the phase modulated signals in the two wavepaths 13 and 16 of the main interferometer circuit of modulator 31. These signal portions are then coupled to conjugate branches 7 and 8 of hybrid coupler 23 which forms an auxiliary interferometer circuit wherein a difference signal, proportional to sin $\phi(t)$, is formed in one of coupler branches 5, and a sum signal, proportion to cos $\phi(t)$, is formed in the fourth coupler branch 6.

It will be noted that the difference signal in branch 5 is an amplitude modulated signal and is essentially the same signal obtained in output coupler branch 2' in FIG. 1. However, anticipating the possibility of an error in the amplitude modulation, the signal derived from coupler 23 is tested against the input modulating signal $e(t)$. This is done by demodulating the difference signal by means of amplitude detector 24 to recover the modulation components sin $\phi(t)$, and then comparing it to a component of the modulating signal $e(t)$ in difference amplifier 25. If the phase modulators 14 and 17 are such that the resulting amplitude modulation sin $\phi(t)$ impressed upon the carrier signal $E(t)$ is proportional to the modulating signal $e(t)$, the output from the difference amplifier will be zero. If, on the other hand, this is not the case, an error signal dA will be produced. However, before the latter signal can be used to effect an error reduction, it must first be weighted by a factor $^1/\cos\phi(t)$, as called for in equation (9). Accordingly, the sum signal in coupler branch 6 is amplitude detected in detector 30 to recover the modulation component which is proportional to cos $\phi(t)$. The error signal dA is then coupled to divider circuit 26 along with the sum signal modulation component cos $\phi(t)$ wherein the indicated division takes place. The weighted error signal $e_r$ derived from divider 26, which is proportional to the phase error $d\phi(t)$, is then coupled to error correcting phase modulator 27 in wavepath 13 and, through a 180° phase shifter 29, to error correcting phase modulator 28 in wavepath 16. These two linear phase modulators impress a correcting phase modulation upon each of the two signal components in wavepaths 13 and 16 which are proportional to error signal $e_r$, and whose sense is such as to reduce the net amplitude error in the output signal derived from branch 2' of coupler 12.

Figure 3:
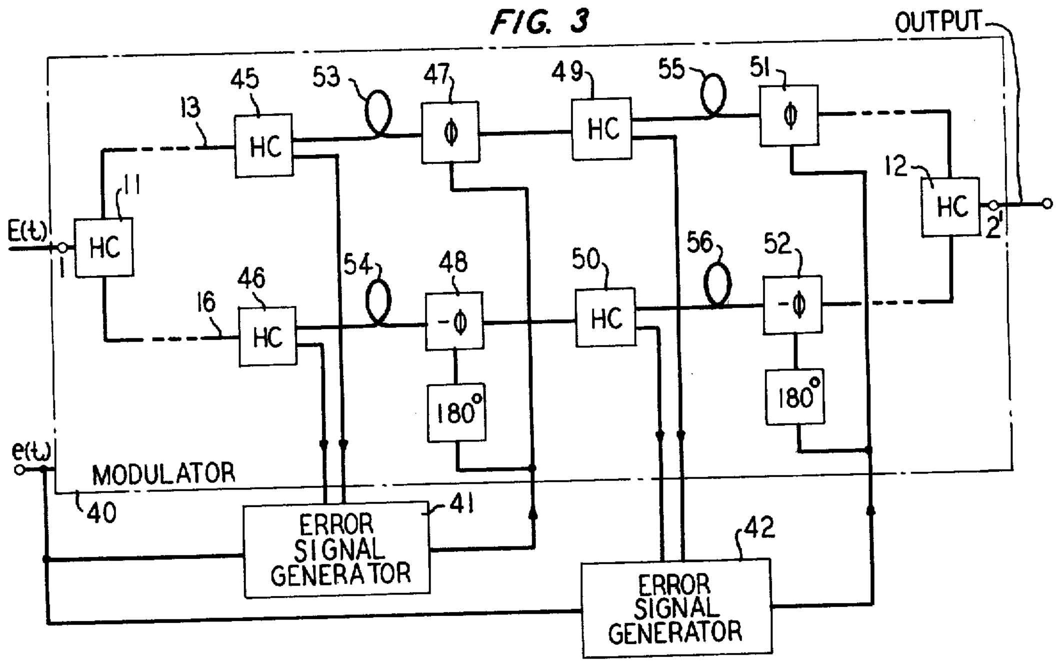
FIG. 3 illustrates the use of two error correcting circuits.

It will be recognized that the correction process can be repeated as often as necessary. This is indicated in FIG. 3, which shows, in block diagram, a modulator 40 and a pair of error signal generators 41 and 42. As in FIG. 2, a pair of signal sampling couplers 45 and 46 in modulator 40 sample the signals in the two modulator wavepaths 13 and 16. The error signal generator 41 generates an error correcting signal, if required, and couples it back into modulator 40 wherein it is applied to the two error correcting phase modulators 47 and 48.

The process is then repeated by means of a second pair of signal sampling couplers 49 and 50, a second error signal generator 42, and a second pair of error correcting phase modulators 51 and 52. If required, additional such means can be added until the specified degree of linearity is achieved.

It will also be recognized that this is a feedforward type of error correction system and, hence, time delay and phase equalization networks are advantageously included to insure that the various signals occur in proper time coincidence. Thus, for example, a time delay network 53 is shown included between coupler 45 and modulator 47 to compensate for the time delay experienced by the signals as they proceed through generator 41. In this way, the error correction is performed by modulator 47 on the appropriate signal.

Similarly, a time delay network 54, 55 and 56 is indicated between each of the other sampling couplers and its associated error correcting phase modulator. Though not shown, it is recognized that suitable time and phase delay networks will also be included within each of the error signal generators if and as required.

As explained hereinabove, two different types of phase modulation characteristics are called for in order to practice the present invention. The first characteristic, called for in each of the signal phase modulators 14 and 17, is one in which the resulting phase modulation $\phi(t)$ is equal to the arcsine of the modulating signal $e(t)$, as indicated by equation (5). This type of characteristic can be closely approximated by the phase modulator described in application Ser. No. 398,388, filed Sept. 18, 1973 and now abandoned. Also see, U.S. Pat. No. 3,304,518.

The second characteristic, called for in each of the error correcting phase modulators 27 and 28, is one in which the resulting phase modulation is a linear function of the modulating signal. This characteristic can be readily obtained by means of the phase modulator illustrated, for example, in FIG. 5 of U.S. Pat. No. 3,815,040.

Figure 4:
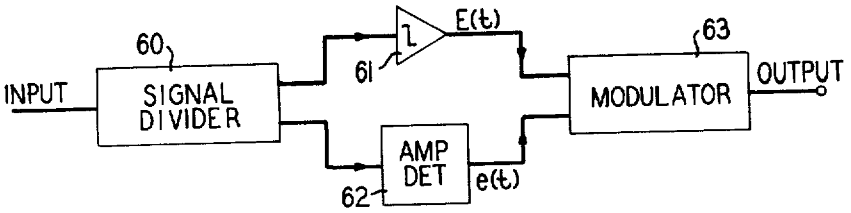
FIG. 4 shows the use of an interferometer modulator as a linear amplifier.

An interferometer modulator, of the type described hereinabove, can be used in conjunction with other circuit components to provide linear amplification of amplitude modulated signals, as explained in U.S. Pat. No. 3,777,275. When so used, the modulator is preceeded by a subcircuit comprising, as illustrated in FIG. 4, a signal divider 60 which divides the input signal into two components. One component is coupled to an amplifier-limiter 61 which strips off the amplitude modulation and produces the constant amplitude, carrier frequency signal $E(t)$. The other component is amplitude detected by means of a detector 62 to recover the modulation signal $e(t)$. These two signals are then coupled to modulator 63 to regenerate the original amplitude modulated signal in the manner described hereinabove.

In those cases where a carrier frequency amplifier is placed before the input to the modulator, as in the embodiment of FIG. 4, it may not be necessary to include amplifiers 15 and 18 in the modulator proper. Thus, it will be recognized that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In a interferometer type amplitude modulator incuding:

an input hybrid coupler;

an output hybrid coupler;

and first and second wavepaths, each of which includes a signal phase modulator, for connecting a pair of conjugate branches of said input coupler to a pair of conjugate branches of said output coupler;

the improvements comprising:

first and second coupling means for extracting a portion of the phase modulated carrier signal derived from each of said phase modulators;

means, utilizing said signal portions, for generating an error signal proportional to the difference between the amplitude of the sum of said signal components and the amplitude of the input modulation signal divided by the cosine of the phase modulation produced by said modulators;

and error correcting phase modulation means located along said wavepaths for phase modulating each of said derived signals in response to said error signal in a sense to minimize the amplitude distortion in the output signal from said output coupler.

2. The modulator according to claim 1 wherein the means for forming said error signal comprises:

a 3dB hybrid coupler having the branches of one pair of conjugate branches coupled, respectively, to said first and second coupling means;

the other pair of conjugate branches of said 3dB coupler including a third branch wherein a difference signal is formed whose amplitude is proportional to the sine of the phase modulation impressed upon the carrier frequency signals by said signal phase modulators in response to an applied modulation signal $e(t)$, and a fourth branch wherein a sum signal is formed whose amplitude is proportional to the cosine of the phase modulation impressed upon said carrier frequency signals by said modulation signal;

a first amplitude detector coupled to said third branch;

a second amplitude detector coupled to said fourth branch;

means for coupling the output from said first detector to a difference amplifier along with a component of said modulating signal to form an error signal dA;

means for dividing said error signal dA by the output from said second detector to form a weighted error signal dA/cos $\phi(t)$;

and means for coupling said weighted error signal to each of said error connecting phase modulation means.

* * * * *